United States Patent Office 3,752,880
Patented Aug. 14, 1973

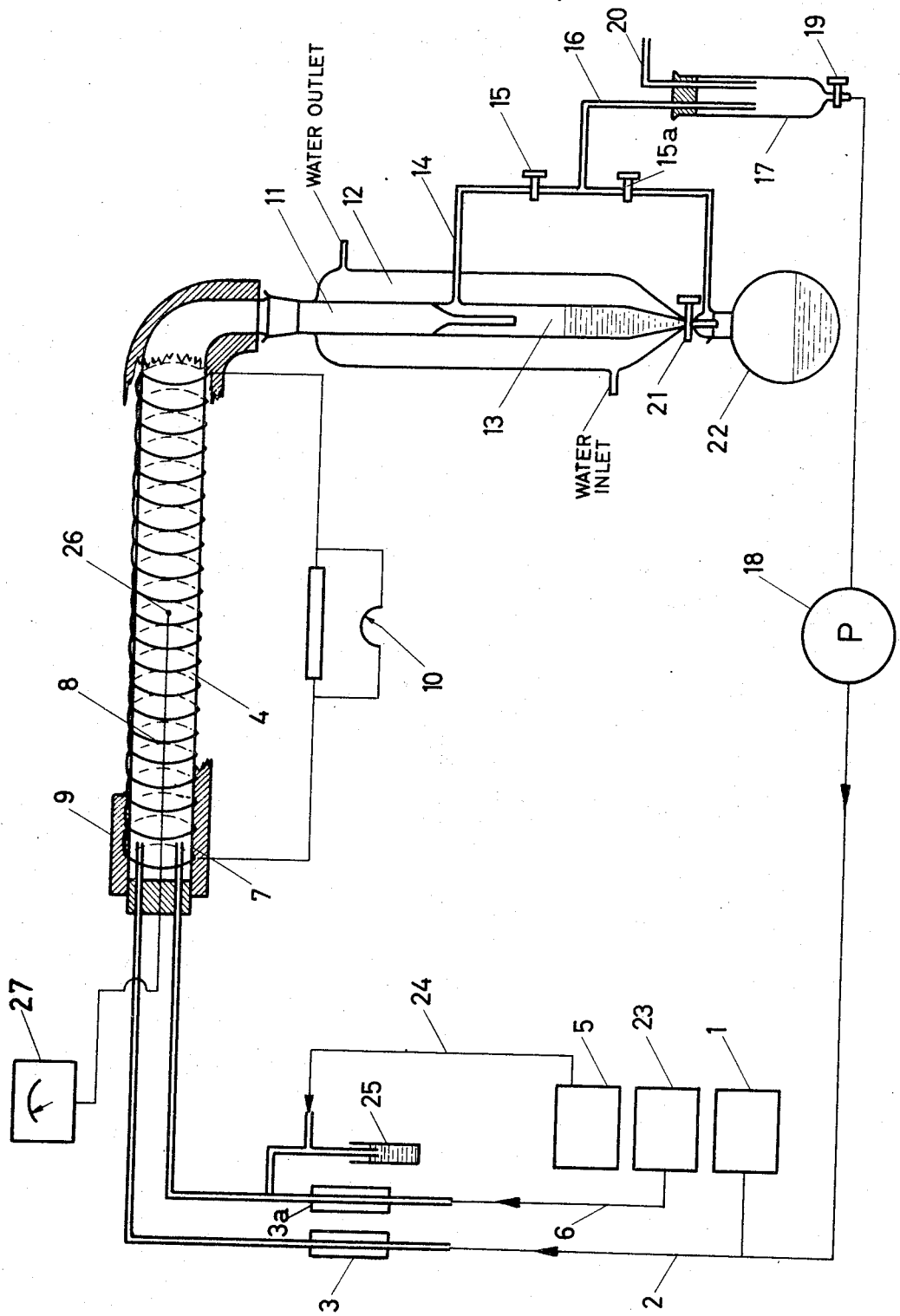

3,752,880
METHOD OF PREPARING ISOCYANIC ACID AND STABILIZING SAME
Walter Stamm, Tarrytown, and Carl C. Greco, Garnerville, N.Y., assignors to Stauffer Chemical Company, New York, N.Y.
Continuation-in-part of abandoned application Ser. No. 426,285, Jan. 18, 1965. This application Mar. 17, 1969, Ser. No. 807,677
Int. Cl. C01c 3/00, 3/14
U.S. Cl. 423—365                           15 Claims

ABSTRACT OF THE DISCLOSURE

A method for the preparation of isocyanic acid from carbamoyl chloride with a hydrogen chloride abstractor, the basicity of which is sufficient to abstract hydrogen chloride from the carbamoyl chloride but insufficient to cause polymerization of the formed isocyanic acid. Preferred hydrogen chloride abstractors are the weak Lewis bases such as the ethers, thioethers and N,N-disubstituted amides.

CROSS REFERENCE TO RELATED APPLICATION

This application is a continuation-in-part of an application filed Jan. 18, 1965, Ser. No. 426,285 for Method of Preparing Isocyanic Acid and Stabilizing Same, in the names of Walter Stamm and Carl C. Greco and now abandoned.

SPECIFICATION

This invention relates to isocyanic acid and a method of preparing it. More particularly, the invention pertains to the preparation of isocyanic acid from carbamoyl chloride. The invention likewise pertains to the formation of isocyanic acid under conditions which prevent it from undergoing polymerization.

Although cyanates and isocyanates, including both organic and inorganic derivatives, are well known the same cannot be said of the patent compounds, i.e. the free cyanic and isocyanic acids. That this should be so is not, however, too surprising. Cyanic and isocyanic acids, which are tautomeric isomers of one another, are extremely unstable under ordinary conditions. In this connection, it is of interst to refer to a publication by M. Linhard in Z.f. anorg. und allgem. Chemie 236, p. 201 (1938) wherein is found the statement "attempts to distill liquid cyanic acid at —30° resulted in explosive polymerizations. A cyanic acid prepared from a very pure cyanuric acid could be warmed to —10° C." In fact, it is generally agreed that cyanic and isocyanic acid have only the most ephemeral existence in the temperature range of from about —10° C. to about 280° C. A singular property of the acids is their stability in excess of about 280° C.

Cyanic and isocyanic acid referred to henceforth herein as isocyanic acid can be prepared in various ways, although the common procedure consists in the pyrolysis of isocyanuric acid above 280° C. The so-formed isocyanic acid, because of its strong propensity to revert to the trimeric isocyanuric acid, is thus difficult to prepare and study under ordinary conditions. Manifestly, the art would be materially advanced if isocyanic acid could be made available in its free state whereby it could be used and handled at essentially room temperature conditions. The highly reactive nature of isocyanic acid renders it useful as to means of introducing the isocyanic function into a wide variety of chemical substrates.

It is, therefore, an object of the invention to provide an economical and readily available source of isocyanic acid. It is another and equally important object of the invention to provide isocyanic acid in a form and state whereby it is stable under ordinary conditions. Other objects will be made apparent subsequently.

In accordance with the present invention it has been discovered that isocyanic acid can be obtained by removing or abstracting hydrogen halide from a carbamoyl halide which for reasons of economy and convenience is preferably carbamoyl chloride. The reaction is illustrated by the following chemical equation:

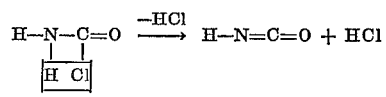

Removal of hydrogen chloride from the carbamoyl chloride can be realized by treating or contacting it with a material the basicity of which is sufficient to abstract the hydrogen chloride but not sufficient to cause polymerization of the so-formed isocyanic acid. Substances having the above perscribed degree of basicity are weak Lewis bases and in this connection the organic ethers have proven especially suitable. Not only are the weak Lewis bases effective for abstracting hydrogen chloride from the carbamoyl chloride but they possess the added and desirable property of preventing or greatly retarding the polymerization of isocyanic acid into its trimeric form-isocyanuric acid, and this constitutes another and valuable aspect of our invention. In other words, the Lewis bases serve the dual function of abstracting the hydrogen chloride from carbamoyl chloride while stabilizing the so-formed isocyanic acid against trimerization. Although it is convenient to employ the same Lewis bases in its double role as a hydrogen chloride abstractor and stabilizer it is to be pointed out that such is not necessary. For instance one particular Lewis base may be used as a hydrogen chloride abstractor and another as a preservative for the resulting isocyanic acid. As previously noted elsewhere herein, the organic ethers serve as excellent Lewis bases for carrying out the objects of the invention, although it is to be understood that any Lewis base having a basicity in the neighborhood of the organic ethers is satisfactory. As understood herein, a Lewis base can be defined as any substance having a free pair or electrons which it is capable of sharing with an electron acceptor, which, in the Lewis sense, is called an acid. For a more detailed description of Lewis bases, reference is made to any of the standard treatises on theoretical organic chemistry, such as, "Electronic Interpretations of Organic Chemistry" by Edward Remick, second edition and published by John Wiley and Sons, Inc. of New York.

As above pointed out, the organic esters are suitable Lewis bases for carrying out the process of the invention. By organic ether is meant any type of organic compound characterized by two organic residues or moieties affixed to a chalcogen atom. As used herein chalcogen is intended to denote oxygen and sulfur. The ether may be a simple ether such as diethylether or a polymeric ether such as a polyoxyethylene resin of the type obtained by reacting ethylene oxide with an alcohol or phenol or similar types of hydroxylic components. Such synthetic resins are well known materials and are described in the technical literature. The organic moieties affixed to the chalcogen atom which are useful in the practice of the present invention can contain from 1 to about 10 carbon atoms inclusive in the structure, but it is preferred that the moieties be alkyl, alkylene, aryl or arylene with up to about 10 carbon atoms. It is generally more preferred to have the moieties attached to the chalcogen atoms contain up to about 6 carbon atoms and most preferably be lower alkyl or alkylene moieties containing from 1 to about 4 carbon atoms inclusive.

It is to be understood that the organic moieties may have substituents appended thereto; said substituents being unreactive to the carbamoyl chloride or the isocyanic acids. As used herein alkyl is intended to denote a monovalent acrylic moiety which would become a saturated aliphatic moiety with the addition of a hydrogen atom, and alkylene is intended to denote a divalent acyclic moiety which would become a saturated aliphatic moiety with the addition of two hydrogen atoms. Lower alkyl and lower alkylene are intended to denote alkyl to denote alkyl or alkylene moieties containing up to about 4 carbon atoms.

As used herein aryl is intended to denote a monovalent moiety which would become a member of the benzene series by the addition of a hydrogen atom, and arylene is intended to denote a divalent moiety which would become a member of the benzene series by the addition of two hydrogen atoms. Thioether compounds are generally found to be effective in the practice of the present invention, That is ether compounds which are effective in the practice of the present invention are found to be useful when a portion or all of the oxygen atoms have been replaced by sulfur atoms.

Examples of ether compounds which are generally useful in the practice of the present invention are compounds such as the following:

Butyl ether $(C_4H_9)-O-(C_4H_9)$
Propyl sulfide $(C_3H_7)-S-(C_3H_7)$
Dimethoxy ethane $CH_3-O-CH_2-CH_2-O-CH_3$
Dimethoxy propane $$CH_3-O-CH_2CH_2CH_2CH_2-O-CH_3$$

Diethoxyethane $(C_2H_5)-O-CH_2CH_2-O-(C_2H_5)$
Dimethoxyoctane $CH_3-O-(C_8H_{16})-C-CH_3$
$\beta,\beta'$-diethoxyethtyl sulfide $(CH_3CH_2-O-CH_2CH_2)_2S$
Dimethoxytetraethylene glycol $CH_3O-(C_2H_4O)_4-CH_3$
Dibutyl Carbitol $(C_4H_9)O-(C_2H_4-O)_2-(C_4H_9)$
Tetraglycol dichloride $$ClCH_2CH_2O-(C_2H_4O)_2-CH_2CH_2Cl$$

Hydroquinone diethyl ether 

Phenyl ether 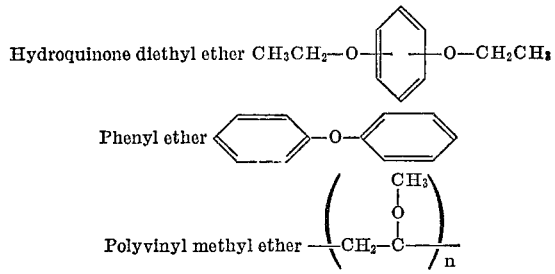

Polyvinyl methyl ether

The above examples are illustrative only and are not intended to be exhaustive of the ether compounds useful in the practice of the present invention. It has been our experience that the preferred ether stabilizers are those having a relatively simple structure and which are liquid under normal conditions. We have, in particular, ascertained that the liquid dialkoxyalkanes are especially suitable as stabilizers for isocyanic acid and as hydrogen chloride abstractors. Of the dialkoxyalkanes the lower members of the series are recommended since they normally are liquids at room temperatures and therefore the most convenient to use and handle. We have, for example, achieved excellent results by treating the carbamoyl chloride with 1,2,-dimethoxyethane. Not only is the 1,2-dimethoxyethane particularly suitable for abstracting or removing hydrogen chloride from the carbamoyl chloride but it serves as an excellent media for stabilizing isocyanic acid.

Other materials which can serve as Lewis bases in carrying out the process of the invention are the thioethers such as dialkylsulfides, e.g. dimethylsulfide, diethylsulfide, di-n-propylsulfide, and the like.

We have also ascertained that certain organic tertiary nitrogen compounds are likewise excellent sources of Lewis bases possessing the requisite low degree of basicity.

In this connection, N,N-disubstituted amides and N-acyl substituted piperidine are found useful in the practice of the present invention. Although it is generally preferred to have up to about 6 carbon atoms in the hydrocarbon moiety attached to the nitrogen or the acid carbon atom, the hydrocarbon moieties can be alkyl or aryl and can have inert substituents appended thereto.

Examples of substituted amides and piperidine compounds which are found useful in the practice of the present invention are as follows:

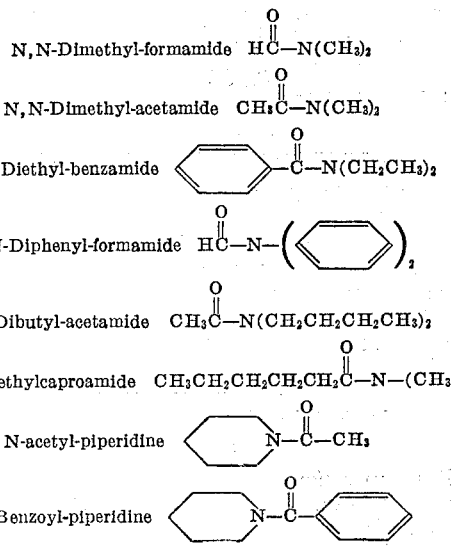

The above examples are illustrative only of the many possible tertiary nitrogen compounds which can be useful in the practice of the present invention. It is to be pointed out, however, that the tertiary nitrogen atom must normally contain at least one electron-with-drawing group in order to reduce its basicity to a point whereby it can serve the two-fold role of functioning as a hydrogen chloride abstractor for the carbamoyl chloride and a preservative for the so-formed isocyanic acid. We have, in this connection, determined that teritary organic Lewis bases such as pyridine or trialkyl amines are excessively basic and react vigorously with the carbamoyl chloride to yield the trimer, isocyanuric acid, rather than the monomeric isocyanic acid. Those skilled in the art will recognize those Lewis bases which have a basicity in the neighborhoood of the organic ethers, which are useful in the practice of the present invention.

It is possible to practice the present invention from about $-80°$ C. to about $150°$ C. due to ease of operation it is preferred that the method be practiced from about $-20°$ C. to about $100°$ C.

Reference is now made to the accompanying drawing constituting a part of this application and in which like numerals designate like parts throughout the same. The drawing shows in schematic form an apparatus which provides a fresh source of carbamoyl chloride with the weak Lewis bases of the invention in order to form free isosyanic acid.

Referring more particularly to the drawing, phosgene from pressure tank 1 is conducted via phosgene supply line 2 through flow meter 3 into reaction zone 4. In like manner, ammonia from pressure tank 23 is conducted via ammonia supply line 6 through flow meter 3a into reaction zone 4. The reaction zone 4 is contained by a Vycor reactor tube 7 of the approximate size 14" x 3" which is supplied with heat from the encircling wire-heating element 8 which is provided with a cover of insulating material 9. Heating elements 8 is controlled by rheostat 10. On entering the heated reaction zone 4 the phosgene at a flow rate of about 395 ml./min. and ammonia at flow rate of about 370 ml./min. combine to produce carbamoyl chloride which then enters the upper chamber 11 of cold water (10–20° C.) condenser 12 and is collected in the graduated reservoir 13. Excess phosgene and the hydrogen chloride by-product are conducted from reservoir 13 through outlet tube 14 past control stopcock 15 via exit tube 16 into the cooled receptacle 17 where the phosgene is condensed and removed through stopcock 19 for recycling by means of pump 18 into phosgene supply line 2. Stopcock 15a is maintained in a closed position while the phosgene circulates through the system. The gaseous hydrogen chloride passes through receptacle 17 which is cooled sufficiently to condense the phosgene and out through exit tube 20. After all excess of phosgene is swept from the reactor 4 and reservoir 13 into 17 by dry nitrogen from tank 5, stopcock 15a is opened, and the carbamoyl chloride is admitted from 13 into receiver 22 through stopcock 21. Receiver 22 contains the weak Lewis base of the type described elsewhere herein for abstracting the hydrogen chloride from the condensed carbamoyl chloride. Preferably, the weakly basic solvent in receiver 22 is agitated and externally cooled during the addition of the carbamoyl chloride. Prior to starting the carbamoyl chloride generator it is recommended that the system and supply lines be flushed with nitrogen supplied from nitrogen pressure tank 5 via nitrogen supply line 24. The mercury relief valve 25 serves as a safety device by preventing excessive pressure build-up in the system.

The invention is illustrated by the following non-limiting examples:

EXAMPLE 1

The apparatus illustrated in the attached drawing was evacuated by purging the system and supply lines with dry nitrogen and the generation of carbamoyl chloride commenced in accordance with the procedure previously described. The apparatus was operated for a period of 50 min. during which time 40 ml. (50.5 g.) of liquid carbamoyl chloride was collected in the water-cooled receiver 13. The system was then purged with nitrogen to remove the reactants from the supply line and exit tubes. The condensed carbamoyl chloride was admitted into the collector flash 22 which contained 400 ml. of 1,2-dimethoxyethane and the resulting mixture warmed to 60° C. for one hour with thorough agitation while at the same time excluding moisture. The mixture was next subjected to fractional distillation at atmospheric pressure taking precaution to exclude all traces of moisture. A forerun of 50 ml. of the 1,2-dimethoxyethane was obtained boiling below 78° C., while an intermediate fraction consisting of about 5–6 grams of carbamoyl chloride was next collected. A main fraction consisting of a complex of free isocyanic acid and 1,2-dimethoxyethane which assayed for 23 grams of isocyanic acid distilled in the temperature range of from 79°–86° C. The main fraction containing the 23 grams of isocyanic acid could be maintained at room temperature without any appreciable polymerization.

EXAMPLE 2

The carbamoyl chloride apparatus as illustrated in the drawing was again put in operation in accordance with the previously described procedure and operated until 12.5 g. 10 ml. (0.156 mole) of carbamoyl chloride had been collected in the receiver 13. The carbamoyl chloride was then admitted from the receiver into the collector flask to which had previously been added 30 ml. of anhydrous benzene containing 13.6 g. (0.156 mole) of dimethylacetamide. On the introduction of the carbamoyl chloride to the dimethylacetamide solution, white crystals of dimethylacetamide hydrochloride immediately precipitated out. During the addition of the carbamoyl chloride, the reaction mixture was maintained at approximately 0° C. and for a period of about one and one-half hours thereafter, while employing vigorous stirring. At the end of the reaction period, the dimethylacetamide hydrochloride crystals were filtered off giving a clear benzene solution containing the isocyanic acid in almost quantitative yield. The free isocyanic acid in benzene gradually underwent transformation into its trimerized derivative, i.e. isocyanuric acid. However, the free isocyanic acid could be preserved at room temperature by adding to the benzene solution one of the weak Lewis acids of the type previously described herein.

EXAMPLE 3

The procedure of Example 2 was repeated by substituting N-acetylpiperidine for the N,N-dimethylacetamide. In general, the yield and results paralleled those obtained in the second example.

A theory which is suggested to explain the remarkable stability of our isocyanic solutions is predicated on the hydrogen bonding between the isocyanic acid and the Lewis base thereby giving rise to a complex or association product of the Lewis base and isocyanic acid. Whereas the complex is sufficiently stable to prevent trimerization of the isocyanic acid, it is not so strongly bonded as to prevent the isocyanic acid from entering into the numerous reactions characteristic of this compound. In support of the aforesaid hypothesis, we have found that at least two moles of a diether such as 1,2-dimethoxyethane are required to achieve a satisfactory conversion of one mole of carbamoyl chloride to isocyanic acid although an excess of the ether is preferably for quantitative conversion. This suggests that one molecule of diether abstracts and binds the HCl while the other molecule loosely complexes the HNCO as schematically set out below:

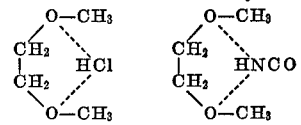

But whatever the exact structure of the complex may be, the free isocyanic acid is available for useful reaction, e.g. conversions of alcohols and phenols to carbamates, metallic and organometallic oxides to metallic isocyanates, acyl chlorides to acyl isocyanates, sulfonyl chlorides to sulfonyl isocyanates, additions to certain olefins and carbonyl compounds, and the like. All these classes of compounds are exceedingly useful for many different applications including production of polymers, foams, plastics, adhesives, cross-linking agents, paper and textile treatments, agricultural formulations and pharmaceuticals. Aside from the manifest economic advantage of a direct production of isocyanic acid from ammonia, an advantage of paramount importance is the remarkable storage stability of our isocyanic solutions at room temperature. In this connection, we have maintained solutions of isocyanic acid in a typical ether such as 1,2-dimethoxyethane for one week with only a few percent of the isocyanic acid reverting to the polymeric cyanuric acid. Obviously, the art is provided with a valuable and useful synthetic tool in the form of such readily available sources of free isocyanic acid.

Although we prefer to obtain isocyanic acid by removal of hydrogen halides from carbamoyl halides, our discovery of the stabilizing effect of weak Lewis bases is applicable to any other source of isocyanic acid such as by the pyrolytic depolymerization of isocyanuric acid. It is to be understood that the invention is not limited to the specific examples disclosed herein since variations in practicing the invention and departures from its scope or spirit will be apparent to those skilled in the art to which the said invention pertains.

What is claimed is:

1. A method of producing isocyanic acid from carbamoyl chloride which comprises contacting the carbamoyl chloride with a Lewis base selected from the group consisting of a dialkoxyalkane, an N,N-disubstituted amide, and an N-acyl substituted piperidine, the basicity of which is sufficient to abstract hydrogen chloride from the carbamoyl chloride, but not sufficient to cause polymerization of the so-formed isocyanic acid.

2. The process of claim 1 wherein the Lewis base is a dialkoxyalkane.

3. The process of claim 2 wherein said dialkoxyalkane is selected from the group consisting of dimethoxyethane, dimethoxypropane, diethoxyethane, and dimethoxyoctane.

4. The process of claim 2 wherein said dialkoxyalkane is 1,2-dimethoxyethane.

5. The method according to claim 1 wherein the Lewis base is an N,N-disubstituted amide.

6. The method of claim 5 wherein said N,N-disubstituted amide is an N,N-dialkylamide.

7. The method of claim 6 wherein said N,N-dialkylamide is N,N-dimethylacetamide.

8. The method of claim 5 wherein said N,N-disubstituted amide is selected from the group consisting of N,N-dimethyl-formamide, N,N-dimethylacetamide, N,N-diethylbenzamide, N,N-dibutylacetamide, N,N-dimethylcaproamide, and N,N-diphenylformamide.

9. The method according to claim 1 wherein the Lewis base is an N-acyl substituted piperidine.

10. The method of claim 9 wherein said N-acyl substitued piperidine is selected from the group consisting of N-acetylpiperidine and N-benzoylpiperidine.

11. The method of claim 9 wherein said N-acyl substituted piperidine is N-acetylpiperidine.

12. A method of producing isocyanic acid from carbamoyl chloride which comprises contacting the carbamoyl chloride with excess 1,2-dimethoxyethane, whereby hydrogen chloride is abstracted from the carbamoyl chloride thereby forming isocyanic acid in the presence of excess 1,2-dimethoxyethane.

13. The method of stabilizing isocyanic acid by contacting said acid with a Lewis base selected from the group consisting of a dialkoxyalkane, an N,N-disubstituted amide, and an N-acyl substituted piperidine, the basicity of which is sufficient to stabilize the isocyanic acid but not sufficient to cause polymerization of the isocyanic acid.

14. The method of claim 13 wherein the Lewis base is a dialkoxy alkane.

15. The method of claim 13 wherein the Lewis base is 1-2-dimethoxy ethane.

References Cited

UNITED STATES PATENTS

| 2,999,873 | 9/1961 | Bloom et al. | 260—544 C |
| 3,314,754 | 4/1957 | Godfrey | 23—151 |
| 2,480,088 | 8/1949 | Slocombe et al. | 260—544 C |

OTHER REFERENCES

Richter: "Organic Chemistry or Chemistry of the Carbon Compounds," vol. 1 (1947), p. 493, Elsevier Publishing Co., Inc., New York.

OSCAR R. VERTIZ, Primary Examiner

H. S. MILLER, Assistant Examiner

U.S. Cl. X.R.

423—268

UNITED STATES PATENT AND TRADEMARK OFFICE
CERTIFICATE OF CORRECTION

PATENT NO. : 3,752,880
DATED : August 14, 1973
INVENTOR(S) : Walter Stamm et al

It is certified that error appears in the above-identified patent and that said Letters Patent are hereby corrected as shown below:

Column 3, line 3, "acrylic" should be -acyclic-- .

Column 3, line 30, "delete one $CH_2$".

Column 4, line 49, "hoood" should be --hood-- .

Column 4, line 52, after 150°C. insert --but-- .

Signed and Sealed this

Fifteenth Day of February 1977

[SEAL]

Attest:

RUTH C. MASON
*Attesting Officer*

C. MARSHALL DANN
*Commissioner of Patents and Trademarks*